US012704730B2

(12) United States Patent
Ma

(10) Patent No.: US 12,704,730 B2
(45) Date of Patent: Aug. 11, 2026

(54) METHOD AND APPARATUS FOR CONTROLLING A SMART GLASSES TEMPLE, AND COMPUTER-READABLE STORAGE MEDIUM

(71) Applicant: GOERTEK TECHNOLOGY CO., LTD., Qingdao (CN)

(72) Inventor: Shengbo Ma, Shandong (CN)

(73) Assignee: GOERTEK TECHNOLOGY CO., LTD., Shandong (CN)

( * ) Notice: Subject to any disclaimer, the term of this patent is extended or adjusted under 35 U.S.C. 154(b) by 304 days.

(21) Appl. No.: 18/575,225

(22) PCT Filed: Dec. 23, 2021

(86) PCT No.: PCT/CN2021/140744
§ 371 (c)(1),
(2) Date: Dec. 28, 2023

(87) PCT Pub. No.: WO2023/273236
PCT Pub. Date: Jan. 5, 2023

(65) Prior Publication Data

US 2024/0310641 A1 Sep. 19, 2024

(30) Foreign Application Priority Data

Jun. 29, 2021 (CN) ......................... 202110730176.2

(51) Int. Cl.
*G02B 27/01* (2006.01)
*G02C 11/00* (2006.01)

(52) U.S. Cl.
CPC .......... *G02B 27/0176* (2013.01); *G02C 11/10* (2013.01); *G02B 2027/0163* (2013.01); *G02B 2027/0178* (2013.01)

(58) Field of Classification Search
CPC ........ G02B 27/0176; G02B 2027/0163; G02B 2027/0178; G02B 2027/0181; G02C 11/10
See application file for complete search history.

(56) References Cited

U.S. PATENT DOCUMENTS 11,137,621 B1 * 10/2021 Castañeda ................ G02C 5/22
11,366,341 B1 * 6/2022 Kubota .................. G02C 7/083
2017/0141806 A1 5/2017 Kuhl et al.
(Continued)

FOREIGN PATENT DOCUMENTS

CN 202281870 U 6/2012
CN 203191639 U 5/2013
(Continued)

*Primary Examiner* — Nathanael R Briggs
(74) *Attorney, Agent, or Firm* — Ingrassia Fisher & Lorenz, LLP

(57) ABSTRACT

A method and apparatus for controlling a smart glasses temple and a computer-readable storage medium are provided. The method is applied to a smart glasses temple comprising a temple body, and the temple body is provided with a detection element used to respond to a trigger element on a glasses frame. The method comprises the steps of: recognizing an interrupt signal of the detection element; and waking up the temple body when the interrupt signal of the detection element is recognized. The technical solution of the present disclosure can achieve richer man-machine interaction experience of the smart glasses.

17 Claims, 8 Drawing Sheets

(56) References Cited

U.S. PATENT DOCUMENTS

| | | | | |
|---|---|---|---|---|
| 2018/0329209 | A1* | 11/2018 | Nattukallingal ....... | G02B 27/01 |
| 2019/0041644 | A1 | 2/2019 | Abele et al. | |
| 2020/0174558 | A1* | 6/2020 | Gui ........................ | G02C 11/10 |
| 2020/0271960 | A1 | 8/2020 | Baek et al. | |

FOREIGN PATENT DOCUMENTS

| | | | |
|---|---|---|---|
| CN | 204269949 | U | 4/2015 |
| CN | 206193378 | U | 5/2017 |
| CN | 107357050 | A | 11/2017 |
| CN | 206805020 | U | 12/2017 |
| CN | 107664841 | A | 2/2018 |
| CN | 107809696 | A | 3/2018 |
| CN | 109077622 | A | 12/2018 |
| CN | 109413786 | A | 3/2019 |
| CN | 109491087 | A | 3/2019 |
| CN | 109907455 | A | 6/2019 |
| CN | 109946853 | A | 6/2019 |
| CN | 110650400 | A | 1/2020 |
| CN | 110687683 | A | 1/2020 |
| CN | 111025679 | A | 4/2020 |
| CN | 111416417 | A | 7/2020 |
| CN | 111665643 | A | 9/2020 |
| CN | 111708164 | A | 9/2020 |
| CN | 211577595 | U | 9/2020 |
| CN | 211698479 | U | 10/2020 |
| CN | 112018843 | A | 12/2020 |
| CN | 212626426 | U | 2/2021 |
| CN | 112526765 | A | 3/2021 |
| CN | 113009715 | A | 6/2021 |
| CN | 113359302 | A | 9/2021 |
| CN | 214751150 | U | 11/2021 |
| JP | S63140423 | A | 6/1988 |

* cited by examiner

METHOD AND APPARATUS FOR CONTROLLING A SMART GLASSES TEMPLE, AND COMPUTER-READABLE STORAGE MEDIUM

CROSS-REFERENCE TO RELATED APPLICATIONS

This Application is a U.S. National-Stage entry under 35 U.S.C. § 371 based on International Application No. PCT/CN2021/140744, filed Dec. 23, 2021 which was published under PCT Article 21(2) and which claims priority to Chinese Application No. 202110730176.2, filed Jun. 29, 2021, which are all hereby incorporated herein in their entirety by reference.

TECHNICAL FIELD

This application pertains to the field of smart wear technology, in particular to a method and apparatus for controlling a smart glasses temple, and a computer-readable storage medium.

BACKGROUND

With the development of science and technology, the smart glasses are gradually popularized, and their related functions are gradually enriched, which brings great convenience to people's work and life. In order to keep pace with the gradual enrichment of functions of the smart glasses, the smart glasses also need to have richer human-computer interaction experience. Therefore, this is also one of the important research and development directions for technicians. In addition, other objects, desirable features and characteristics will become apparent from the subsequent summary and detailed description, and the appended claims, taken in conjunction with the accompanying drawings and this background.

SUMMARY

The main object of the present disclosure is to provide a method and apparatus for controlling a smart glasses temple, and a computer-readable storage medium, so as to realize richer human-computer interaction experience for smart glasses.

In order to achieve the above object, the present disclosure proposes a method for controlling a smart glasses temple, wherein the method is applied to a smart glasses temple comprising a temple body, the temple body is provided with a detection element used to respond to a trigger element on a glasses frame, and the method comprises the steps of:

recognizing an interrupt signal of the detection element; and waking up the temple body when the interrupt signal of the detection element is recognized.

Optionally, after the step of waking up the temple body, the method further comprises:

performing threshold judgment on the data obtained by the detection element;

when a magnetic flux is within a first preset range, determining that the temple body is in a state of being connected to the glasses frame; and when the magnetic flux is within a second preset range, determining that the temple body is in a state of entering a glasses case.

Optionally, after the step of determining that the temple body is in a state of being connected to the glasses frame, the method further comprises:

according to comparison of the magnetic flux and multiple preset sections, determining a type of the glasses frame connected to the temple body.

Optionally, the step of determining the type of the glasses frame connected to the glasses temple body comprises:

when the magnetic flux is in a first section, determining that the temple body is connected to a glasses frame equipped with a myopic lens;

when the magnetic flux is in a second section, determining that the temple body is connected to a glasses frame equipped with a hyperopic lens;

when the magnetic flux is in a third section, determining that the temple body is connected to a glasses frame equipped with a sun lens; and when the magnetic flux is in a fourth section, determining that the temple body is connected to a glasses frame equipped with a plano lens.

Optionally, after the step of determining that the temple body is in a state of being connected to the glasses frame, the method further comprises:

performing a wireless back-connection operation.

Optionally, after the step of performing the wireless back-connection operation, the method further comprises:

controlling the terminal device to perform a pop-up reminder.

Optionally, the glasses temple body is provided with an electrical port used for electrical conduction with the glasses frame:

after the step of determining that the temple body is in a state of being connected to the glasses frame, the method further comprises:

switching the electrical port to a communication mode.

Optionally, the temple body is provided with an electrical port used for electrical conduction with the glasses case:

after the step of determining that the temple body is in a state of entering a glasses case, the method further comprises:

switching the electrical port to a charging mode.

The present disclosure also proposes an apparatus for controlling a smart glasses temple. The apparatus for controlling a smart glasses temple comprises a processor, a memory, and a program for controlling a smart glasses temple that is stored in the memory and can run on the processor;

when the program for controlling a smart glasses temple runs on the processor, the method for controlling a smart glasses temple described in any one of the above embodiments is executed.

The present disclosure also proposes a computer-readable storage medium having a program for controlling a smart glasses temple stored thereon;

when the program for controlling a smart glasses temple runs on a processor, the method for controlling a smart glasses temple described in any one of the above embodiments is executed.

The method for controlling a smart glasses temple of the present disclosure recognizes the interruption signal of the detection element, and wakes up the temple body when the interruption signal of the detection element is recognized. In this way, it is equivalent to providing a solution for judging the in-position state of the temple body by using plug-in detection, which is beneficial to realize more interactive functions, so that the smart glasses temple and the smart glasses equipped with the smart glasses temple have richer human-computer interaction experience.

BRIEF DESCRIPTION OF DRAWINGS

The present invention will hereinafter be described in conjunction with the following drawing figures, wherein like numerals denote like elements, and.

Figure 1:
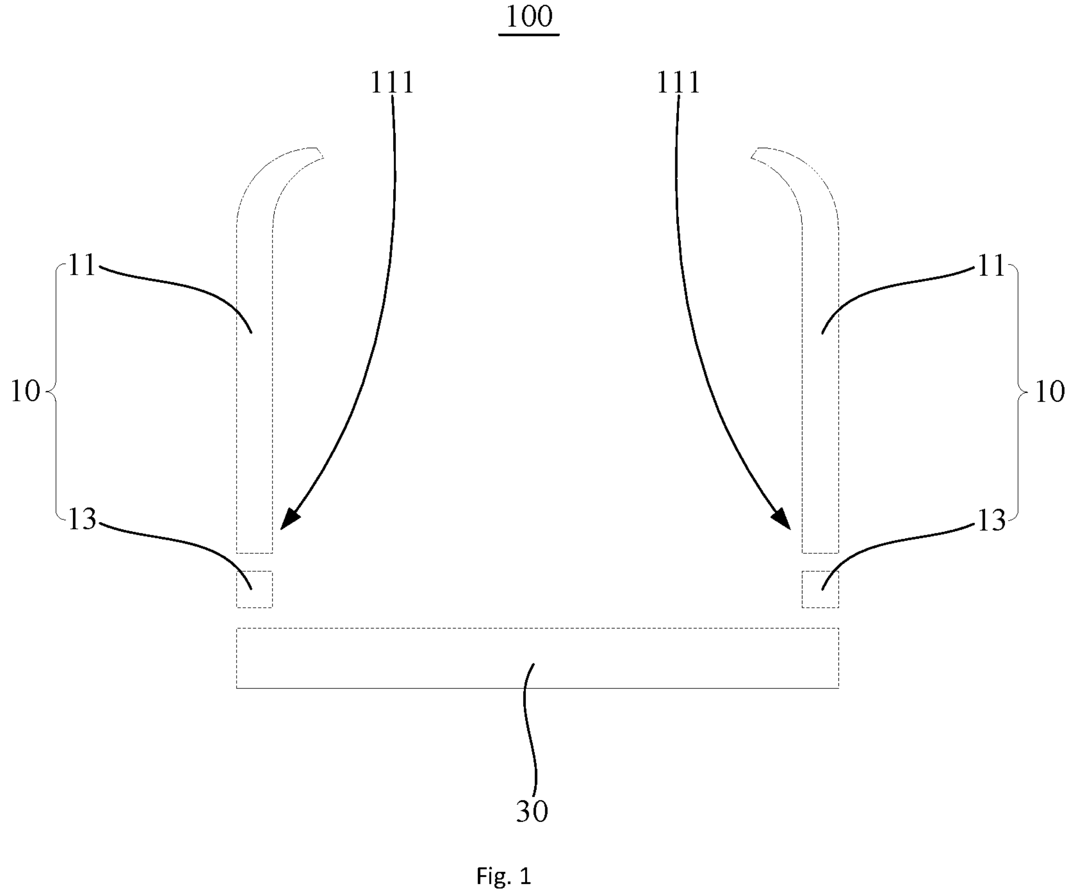
FIG. 1 is a schematic diagram of the structure of an embodiment of smart glasses of the present disclosure.

The realization of object, functional characteristics and advantages of the present disclosure will be further described in conjunction with the embodiments and with reference to the accompanying drawings.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

The technical solutions in embodiments of the present disclosure will be described clearly and completely below with reference to the drawings in the embodiments of the present disclosure. Obviously, the embodiments as described below are merely part of, rather than all, embodiments of the present disclosure. Based on the embodiments of the present disclosure, any other embodiment obtained by a person of ordinary skill in the art without paying any creative effort shall fall within the protection scope of the present disclosure.

It should be noted that all directional indications (such as up, down, left, right, front, back, etc.) in the embodiments of the present disclosure are only used to explain the relative positional relationship, the movement situation, etc. among various components under a certain posture (as shown in the accompanying drawings). If the specific posture changes, the directional indication will also change accordingly.

In the present disclosure, unless otherwise expressly specified and defined, the terms "connected", "fixed" and the like should be understood in a broad sense, for example, it may be fixedly connected, or removably connected, or integrally connected; it may also be mechanically connected or electrically connected; it may also be directly connected or indirectly connected through a middleware; it may also be internally communicated or interacted between two components. For a person of ordinary skill in the art, the specific meaning of these terms in the present disclosure should be understood according to specific situations.

In addition, in the present disclosure, the terms "first" and "second" are used for descriptive purposes only and are not to be construed as indicating or implying relative importance or implicitly indicating the number of indicated technical features. Thus, a feature with "first" or "second" may explicitly or implicitly include at least one such a feature. In addition, the technical solutions in various embodiments of the present disclosure can be combined with each other if their combination is realizable to a person of ordinary skill in the art. When the combination of technical solutions is contradictory or cannot be realized, it should be considered that such a combination of technical solutions does not exist and is not within the scope of protection claimed in the present disclosure.

With respect to the problems raised in the background part, the present disclosure proposes a method for controlling a smart glasses temple, which is applied to a smart glasses temple.

As shown in FIG. 1, in an embodiment of the present disclosure, the smart glasses temple 10 comprises:

- a temple body 11 having a mounting end 111 for connecting to a glasses frame 30; and
- an adapter 13 having an assembling end to detachably connected to the mounting end 111 and an adapting end to detachably connected to the glasses frame 30.

It can be understood that the temple body 11 is a smart device equipped with electronic components, and the electronic components include but are not limited to wireless communication chips, audio codec chips, audio amplifiers, acoustic devices, batteries, charging chips, fuel gauges, battery management units, etc. Generally, it can be used to realize wireless connection function, "downlink" audio playback function, "uplink" voice call function, charging function, etc. Among them, the acoustic devices include but are not limited to speakers, microphones, bone conduction units, etc., and with the corresponding structure stacking and acoustic cavity design, they can realize the functions such as audio playback and voice call mentioned above. There may be multiple acoustic devices, and different audio effects can be achieved by combining them with software methods such as algorithms. Moreover, the sound guiding function may also be realized by adding accessories, such as a silicone sleeve or a plastic sleeve, to the outside of the temple body 11. In addition, besides the mounting end 111, the temple body 11 generally also has an ear support end for hanging on the user's ear.

The adapter 13 has two ends, i.e., the assembling end and the adapting end.

The assembling end is used to detachably connect with the mounting end 111 of the glasses temple body 11. Specifically, the assembling end may be provided with one of a plug-in slot and a plug-in block, and the mounting end 111 may be provided with the other of the plug-in slot and the plug-in block. By inserting the plug-in block into the plug-in slot, the plug-in connection can be realized between the assembling end and the mounting end 111, and thus the detachable connection is realized between the adapter 13 and the temple body 11. Of course, the plug-in connection may also be replaced or supplemented with screw connection, magnetic connection, buckle connection and other methods.

The adapting end is used to detachably connect with an end of the glasses frame 30. Specifically, the adapting end may be provided with one of a plug-in slot and a plug-in block, and the end of the glasses frame 30 may be provided with the other of the plug-in slot and the plug-in block. By inserting the plug-in block into the plug-in slot, the plug-in connection can be realized between the adapting end and the end of the glasses frame 30, and thus the detachable connection is realized between the adapter 13 and the glasses frame 30. Of course, the plug-in connection may also be replaced or supplemented with screw connection, magnetic connection, buckle connection and other methods.

In sum, in the smart glasses temple 10 of this embodiment, the temple body 11 can be detachably connected to a glasses frame 30 through the adapter 13; moreover, the temple body 11 and the adapter 13 are also detachably connected. In this way, a new form is provided for the smart glasses 100, i.e., the smart glasses 100 is provided with a "three-stage" detachable design in which the glasses frame 30 and the adapter 13 are detachably connected, and the adapter 13 and the temple body 11 are detachably connected, thereby avoiding the integrated design of the smart glasses 100 in the prior art, and solving the problem that the smart glasses 100 are inconvenient to carry and charge.

In an embodiment of the smart glasses temple 10 of the present disclosure, the adapter 13 comprises:

a first joint; and a second joint, an end of which is rotatably connected to an end of the first joint;

wherein an end of the first joint that is away from the second joint constitutes the assembling end, and an end of the second joint that is away from the first joint constitutes the adapting end.

It can be understood that in the smart glasses temple 10 of this embodiment, the adapter 13 is mainly composed of two joints, the two joints are respectively used to detachably connected to the temple body 11 and the glasses frame 30, and the two joints are rotatably connected. In this way, the relative rotation between the two joints can realize the folding and unfolding of the temple body 11 relative to the glasses frame 30, and provide the smart glasses temple 10 with a foldable function. Moreover, by setting the rotating position between the two joints, the structural design of the detachable connections between the adapter 13 and the temple body 11, and between the adapter 13 and the glasses frame 30 can also be effectively simplified, thereby reducing the difficulty of connections, improving the convenience of connection, and facilitating the use of users.

In an embodiment of the smart glasses temple 10 of the present disclosure, the assembling end is provided with a trigger element, and the mounting end 111 is provided with a detection element, and the detection element is used to respond to the trigger element.

It can be understood that the trigger element may be buried in the assembling end and completely hidden; it may also be embedded on the end surface of the assembling end, and part of the surface is exposed; it may also be fixed on the outer wall of the assembling end and protrude. as long as it can trigger the detection element when the assembling end is connected to the mounting end 111. Similarly, the detection element may be buried in the mounting end 111 and completely hidden; it may also be embedded on the end surface of the mounting end 111, and part of the surface is exposed; it may also be fixed on the outer wall of the mounting end 111 and protrude, as long as it can respond to the trigger element when the assembling end is connected to the mounting end 111.

In this way, by using the response of the detection element to the trigger element or failure to respond to the trigger element, different feedback signals can be formed for subsequent logical judgments, thereby completing corresponding detection functions (such as plug-in detection, pull-out detection, etc.), which is conducive to the realization of different interactive behaviors (such as power on and off, Bluetooth connection, information prompts, etc.), and richer human-computer interaction experience can be realized.

Specifically, the trigger element may be a magnetic element, and the detection element may be a Hall sensor.

In this way, when magnetic parts with different magnetic field strengths are provided on the assembling ends of multiple adapters 13, the multiple adapters 13 can be distinguished and detected by using different feedback signals generated by the Hall sensor in response to the magnetic parts with different magnetic field strengths, thereby completing the corresponding interactive behavior. For example, different adapters 13 (i.e., adapters 13 equipped with magnetic elements with different magnetic field strengths) are connected to different glasses frames 30. At this moment, by distinguishing and detecting the adapters 13, it can be known which type of glasses frame 30 is currently connected to the temple body 11, such as the glasses frame 30 equipped with a myopic lens, the glasses frame 30 equipped with hyperopic lenses, the glasses frame 30 equipped with a sun lens, or the glasses frame 30 equipped with plano lens, thereby completing the voice prompt that a corresponding lens is being used.

Of course, in other embodiments, auxiliary detection elements such as a gyroscope, an acceleration sensor, and a multi-axis attitude sensor may also be added for auxiliary determination. thereby improving the detection accuracy. Moreover, through software design, functions such as interaction between the left and right temples, dual-device pairing, master-slave switching. upgrade, folding detection, and wearing detection can also be realized.

In an embodiment of the smart glasses temple 10 of the present disclosure, the assembling end is provided with a first magnetic attraction member, the mounting end 111 is provided with a second magnetic attraction member, and the second magnetic attraction member is used to attract the first magnetic attraction member.

It can be understood that the first magnetic member can be buried in the assembling end and completely hidden; it can also be embedded on the end surface of the assembling end, and part of the surface can be exposed; it can also be fixed on the outer wall of the assembling end and protrude, as long as when the assembling end is connected to the mounting end 111, it can be attracted to the second magnetic attraction member. Similarly, the second magnetic member can be buried in the mounting end 111 and completely hidden; it can also be embedded on the end surface of the mounting end 111, and part of the surface can be exposed; it can also be fixed on the outer wall of the mounting end 111 and protrude, as long as when the assembling end is connected to the mounting end 111, it can respond to the first magnetic attraction member.

In this way, by using the attraction of the first magnetic attraction member and the second magnetic attraction member, not only the connection between the assembling end and the mounting end 111 can be realized, but also the automatic alignment function and the active connection function within a certain range can be realized.

It should be noted that the method of connecting the assembling end and the mounting end 111 by using the attraction between the first magnetic attraction member and the second magnetic attraction member may be used alone, or be used in combination with the plug-in method so as to have better connection stability. In addition, when the method of attracting between the first magnetic attraction member and the second magnetic attraction member is used in combination with the method of triggering the response by the trigger element and the detection element, a suitable software algorithm may be used to "shield" the influence of the first magnetic attraction member and the second magnetic attraction member on the detection element, so that the detection element only responds to the trigger element.

In an embodiment of the smart glasses temple 10 of the present disclosure, the mounting end 111 is provided with an electrical port, and the electrical port is used for electrical conduction with the glasses frame 30 or the charging box.

Specifically, when it is necessary to realize operations such as data interaction between the temple body 11 and the glasses frame 30, an electrical port may be respectively provided on the assembling end and the adapting end of the adapter 13, and an electrical port is provided on the glasses frame 30. At this moment, the mounting end 111 of the temple body 11 is connected to the assembling end of the adapter 13 so that the two electrical ports between the two are electrically connected, and the adapting end of the adapter 13 is connected to the glasses frame 30 so that the two electrical ports between the two are electrically connected. In this way, the electrical conduction between the temple body and the glasses frame 30 can be realized, thereby realizing operations such as data interaction.

Similarly, when it is necessary to realize operations such as data interaction and charging between the temple body 11 and the glasses case, an electrical port may be provided on the glasses case. At this moment, the temple body 11 enters the glasses case and comes to a specific position to make the two electrical ports between the two electrically conductive. In this way, the electrical conduction between the temple body 11 and the glasses case can be realized, thereby realizing operations such as data interaction and charging.

It should be noted that the electrical port may be in the form of USB Type-A, USB Type-B, USB Type-C, Lightning, etc. Moreover, the two electrical ports in pair may be in the form of male port and female port, so as to improve the stability of electrical conduction.

It can be understood that when the electrical conduction between the two electrical ports is only for realizing the charging function, the electrical port may be in simple forms such as metal contacts, metal elastic pieces, and metal thimbles.

In an embodiment of the smart glasses temple 10 of the present disclosure, the glasses temple body 11 is provided with a wireless charging receiving coil.

It can be understood that the wireless charging receiving coil can cooperate with a wireless charging transmitting coil in the glasses case to realize wireless charging, which is convenient for users to use.

In an embodiment of the smart glasses temple 10 of the present disclosure, the temple body 11 is provided with an auxiliary detection element.

It can be understood that the auxiliary detection element include but are not limited to geomagnetic sensors, acceleration sensors, inertial navigation sensors, Hall sensors, pressure sensors, radars, temperature and humidity sensors, ultraviolet sensors, altitude sensors, capacitive inductive sensors, optical sensors, time-of-flight sensors, infrared sensor, heart rate sensor, blood oxygen sensor, blood pressure sensor, etc., so that rich human-computer interaction functions can be completed, which include but are not limited to wearing detection, plugging detection, charging detection, connection detection, human ear contour detection, environmental detection, magnetic flux detection, posture and motion trajectory detection, step counting detection, health detection, gesture recognition, touch control, press control, distance and position detection, etc.

The method for controlling a smart glasses temple that the present disclosure proposes is described below.

Figure 2:
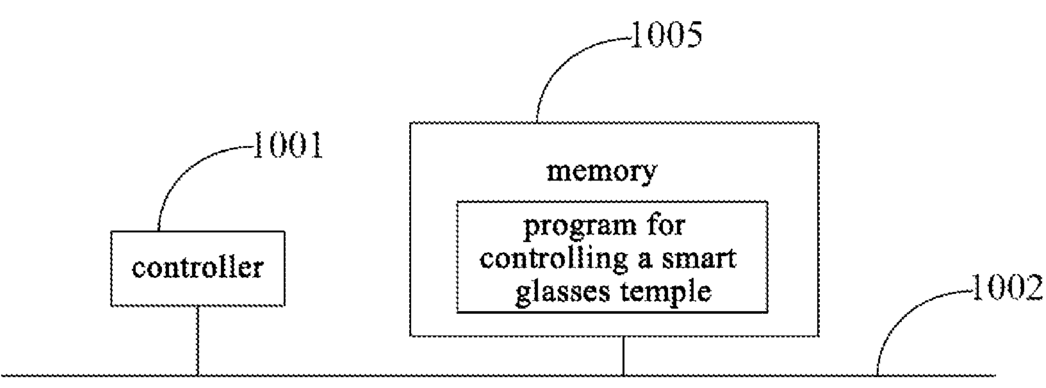
FIG. 2 is a schematic diagram of the device structure of the hardware operating environment involved in an embodiment of a method for controlling a smart glasses temple of the present disclosure.

FIG. 2 is a schematic diagram of the device structure of the hardware operating environment involved in an embodiment of the method for controlling a smart glasses temple of the present disclosure.

As shown in FIG. 2, the device comprises: a controller 1001 (such as CPU, SOC, MCU, etc.), a communication bus 1002, a memory 1005, etc. Among them, the communication bus 1002 is used to realize connection and communication among other components. The memory 1005 may be either a high-speed RAM memory or a non-volatile memory, such as a disk memory. Optionally, the memory 1005 may also be a storage device independent of the processor 1001.

Those skilled in the art can understand that the device structure shown in FIG. 2 does not constitute a limitation on the device, and the device may comprise more or fewer components than those shown in the FIG. 2, or be a combination of some components, or have different component arrangements.

Based on the embodiment of the smart glasses temple 10 in which "the assembling end is provided with a trigger element, the mounting end 111 is provided with a detection element, and the detection element is used to respond to the trigger element", the controller 1001 may call the program for controlling a smart glasses temple stored in the memory 1005, and perform the following operations:

recognizing an interrupt signal of the detection element; and waking up the temple body 11 when the interrupt signal of the detection element is recognized.

Further, the controller 1001 may call the program for controlling a smart glasses temple stored in the memory 1005, and also perform the following operations:

performing threshold judgment on the data obtained by the detection element;

when a magnetic flux is within a first preset range, determining that the temple body 11 is in a state of being connected to the glasses frame 30; and when the magnetic flux is within a second preset range, determining that the temple body 11 is in a state of entering a glasses case.

Further, the controller 1001 may call the program for controlling a smart glasses temple stored in the memory 1005, and also perform the following operations:

according to comparison of the magnetic flux and multiple preset sections, determining a type of the glasses frame 30 connected to the temple body 11.

Further, the controller 1001 may call the program for controlling a smart glasses temple stored in the memory 1005, and also perform the following operations:

when the magnetic flux is in a first section, determining that the temple body 11 is connected to a glasses frame 30 equipped with a myopic lens;

when the magnetic flux is in a second section, determining that the temple body 11 is connected to a glasses frame 30 equipped with a hyperopic lens;

when the magnetic flux is in a third section, determining that the temple body 11 is connected to a glasses frame 30 equipped with a sun lens; and when the magnetic flux is in a fourth section, determining that the temple body 11 is connected to a glasses frame 30 equipped with a plano lens.

Further, the controller 1001 may call the program for controlling a smart glasses temple stored in the memory 1005, and also perform the following operations:

performing a wireless back-connection operation.

Further, the controller 1001 may call the program for controlling a smart glasses temple stored in the memory 1005, and also perform the following operations:

controlling the terminal device to perform a pop-up reminder.

First Embodiment

Figure 4:
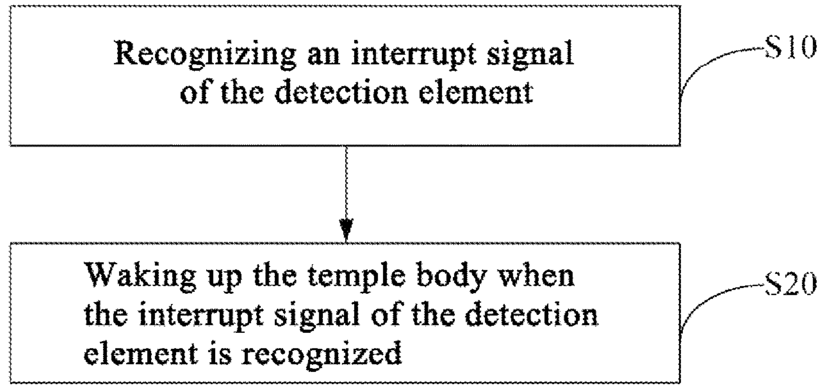
FIG. 4 is a schematic flow chart of a first embodiment of a method for controlling a smart glasses temple of the present disclosure.

Referring to FIG. 4, the method for controlling a smart glasses temple comprises the steps of:

Step S10, recognizing an interrupt signal of the detection element; and

Step S20, waking up the temple body 11 when the interrupt signal of the detection element is recognized.

For example, the trigger element is a magnetic member, and the detection element is a Hall sensor. The Hall sensor is in a state of constant power-on, and can perform interrupt monitoring in a state of ultra-low power consumption. When the temple body 11 is connected to the adapter 13, or when the temple body 11 enters the glasses case, if the change of the magnetic flux on the Hall sensor meets a preset condition, an interrupt signal is generated, so that the temple body 11 is woken and powered-on, which facilitates subsequent operations of the temple body 11, such as normal operation, charging, etc.

In other words, as long as the temple body 11 is in an in-position state, for example, a state of being connected to the adapter 13 (at this moment, if the adapter 13 has been pre-installed on the glasses frame 30, it can be further determined that the temple body 11 is in the wearable state, i.e., in the state of being connected to the glasses frame 30), a state of entering the glasses case, etc., the temple body 11 can be automatically woken up and powered on to meet the needs of subsequent operations. In this way, it is equivalent to providing a solution for judging the in-position state of the temple body 11 by using plug-in detection, which is conducive to realizing more interactive functions, so that the smart glasses temple 10 and the smart glasses 100 equipped with the smart glasses temple 10 have richer human-computer interaction experience.

Of course, it is understandable that in some false triggering scenarios, misjudgment of plugging and unplugging may occur. At this moment, additional sensor data such as acceleration, posture, and optical sensor data are needed to assist the judgment. For example, the detected motion range of plugging and unplugging the temple body 11 is used as the basis for input judgment to avoid misjudgment.

Second Embodiment

Figure 5:
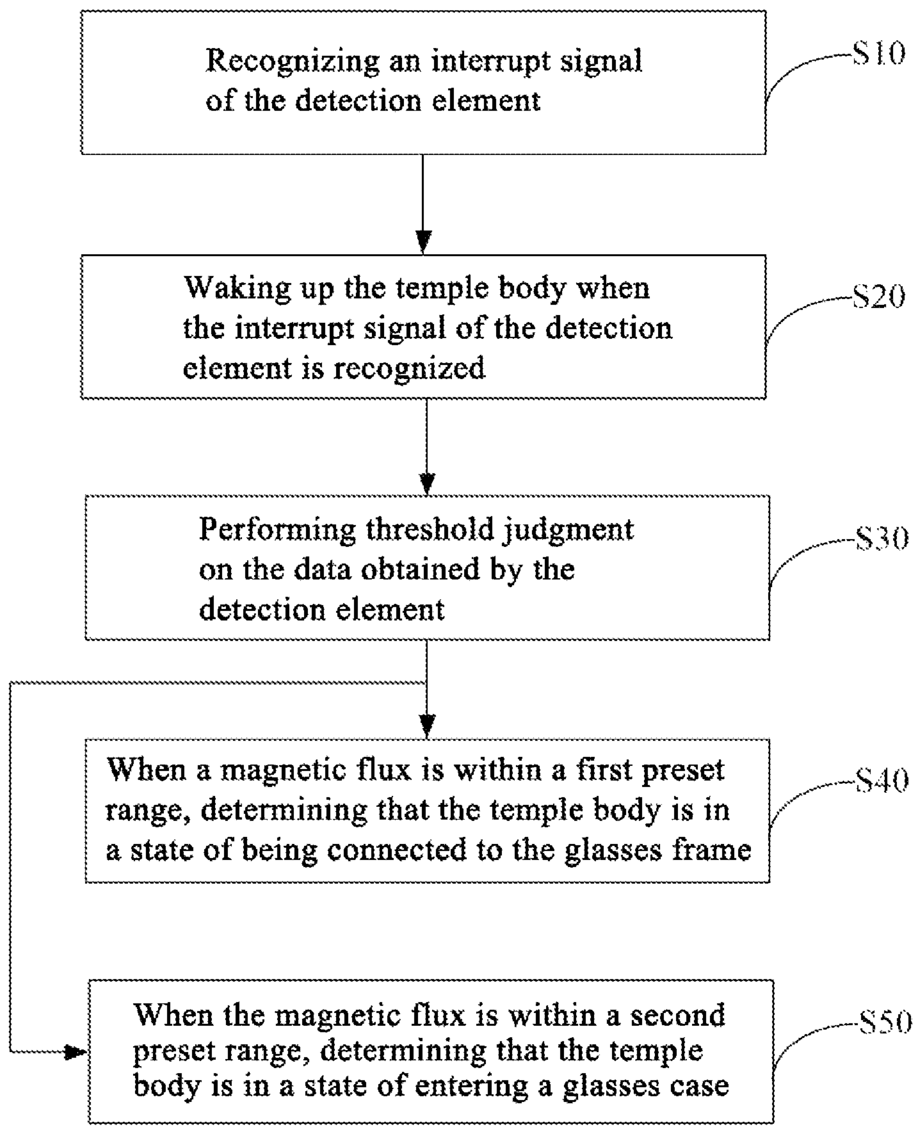
FIG. 5 is a schematic flow chart of a second embodiment of a method for controlling a smart glasses temple of the present disclosure.

Referring to FIG. 5, after the step S20, that is, after waking up the temple body 11, the method further comprises:

Step S30, performing threshold judgment on the data obtained by the detection element;

Step S40, when a magnetic flux is within a first preset range, determining that the temple body 11 is in a state of being connected to the glasses frame 30; and Step S50, when the magnetic flux is within a second preset range, determining that the temple body 11 is in a state of entering a glasses case.

For example, when the magnetic flux is in a range A, it can be determined that the temple body 11 is in a state of being connected to the adapter 13. At this moment, if the adapter 13 has been pre-installed on the glasses frame 30, it can be further determined that the temple body is 11 is in the wearable state (that is, in the state of being connected to the glasses frame 30). At this moment, operations such as Bluetooth back-connection, controlling the terminal device to perform a pop-up reminder, data interaction with the terminal device, and data interaction with the glasses frame 30 can be performed.

On the other hand, when the magnetic flux is in a range B, it can be determined that the temple body 11 is in the state of entering the glasses case. At this moment, operations such as charging and data interaction of information such as the electric quantity with the glasses case can be performed.

Figure 3:
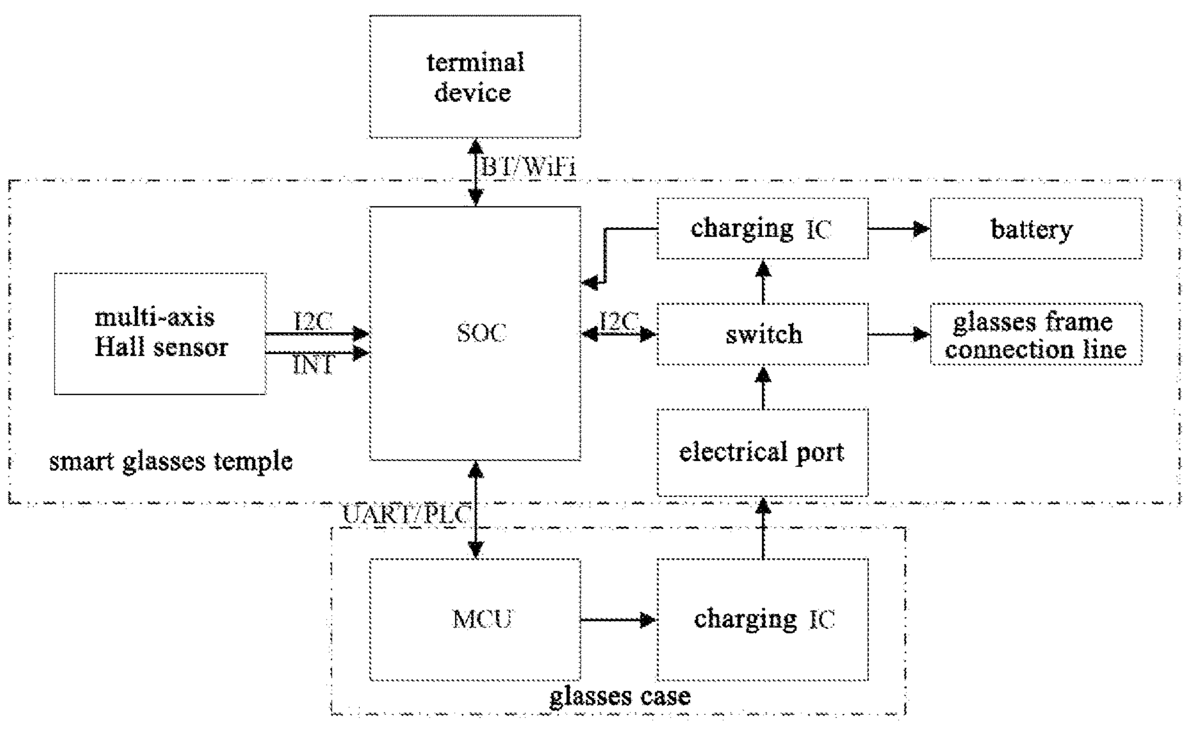
FIG. 3 is a schematic diagram of the circuit connection of a smart glasses temple, a glasses case and a terminal device of the present disclosure.

It should be noted that, as shown in FIG. 3, the operation of "Bluetooth back-connection" performed by the temple body 11 can be realized through the Bluetooth module carried thereon.

The operation of "controlling the terminal device to perform a pop-up reminder" performed by the temple body 11 can be realized by a wireless communication chip (for example. a Bluetooth module, a WIFI module, a 2.4G module, a Zigbee module, etc.) carried thereon.

The operation of "data interaction with the glasses frame 30" performed by the temple body 11 can be realized through an electrical port (for example, USB Type-A, USB Type-B, USB Type-C, Lightning, etc.) or a wireless module (for example, Bluetooth module, WIFI module, 2.4G module, Zigbee module, etc.) carried thereon.

The "charging" operation performed by the temple body 11 can be realized through an electrical port (for example, USB Type-A, USB Type-B, USB Type-C, Lightning, etc.) or a wireless charging module carried thereon.

The operation of "data interaction of information such as the electric quantity with the glasses case" performed by the temple body 11 can be realized through an electrical port (for example, USB Type-A, USB Type-B, USB Type-C, Lightning, etc.) or a wireless module (for example, a Bluetooth module, a WIFI module, a 2.4G module, a Zigbee module, etc.) carried thereon.

In other words, by using different preset ranges to classify the magnetic flux monitored by the detection element, different in-position states of the temple body 11 (such as a wearable state, i.e., the state of being connected to the glasses frame 30, the state of entering the glasses case, etc.) can be judged, which is conducive to activating the corresponding interactive behavior (such as Bluetooth back-connection, data interaction, charging, etc.), and is conducive to realizing more interactive functions, so that the smart glasses temple 10 and the smart glasses 100 equipped with the smart glasses temple 10 have richer human-computer interaction experience.

Third Embodiment

Figure 6:
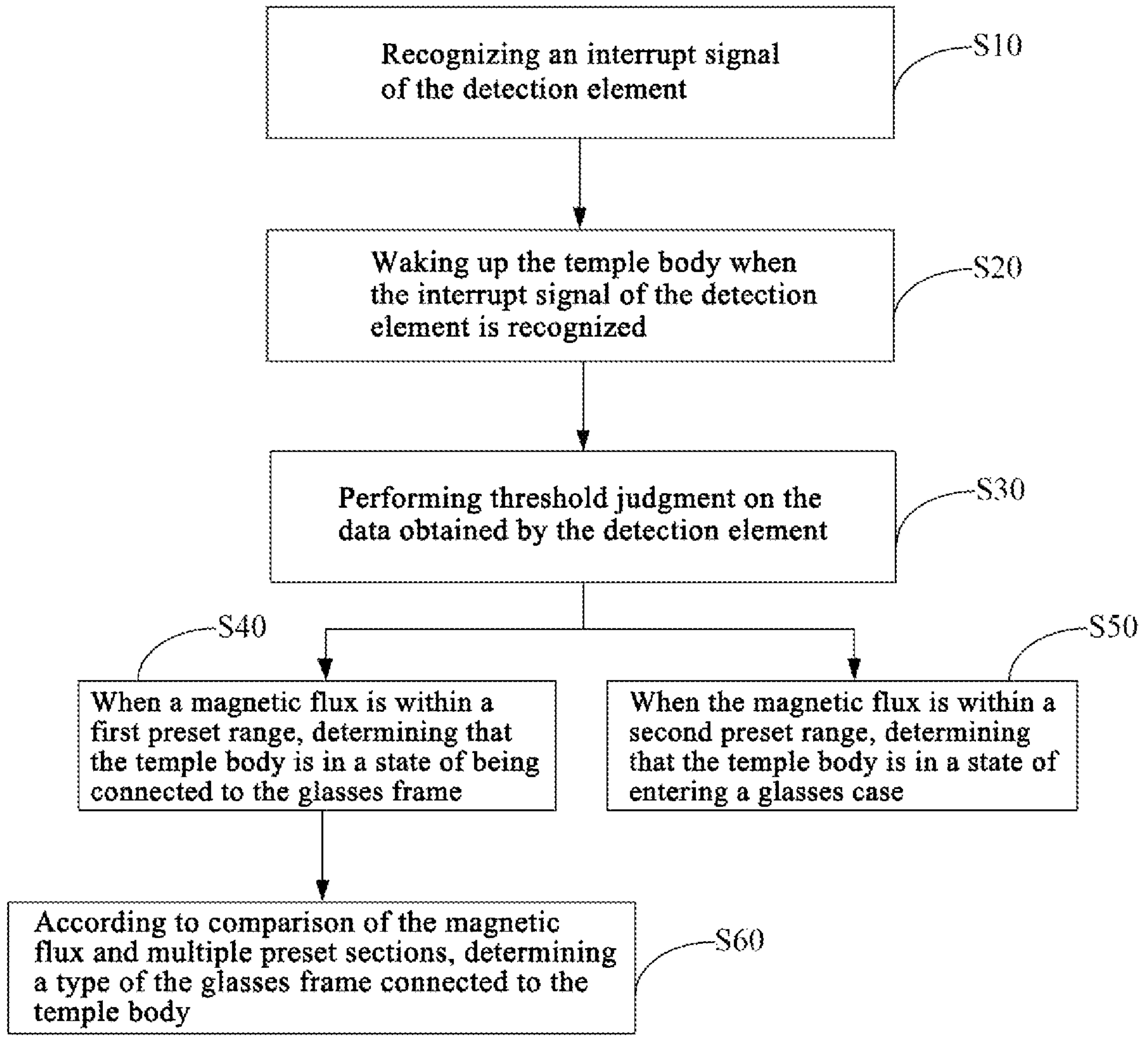
FIG. 6 is a schematic flow chart of a third embodiment of a method for controlling a smart glasses temple of the present disclosure.

Referring to FIG. 6, after the step S40, that is, after determining that the temple body 11 is in the state of being connected to the glasses frame 30, the method further comprises:

Step S60, according to comparison of the magnetic flux and multiple preset sections. determining a type of the glasses frame 30 connected to the temple body 11.

Specifically, when there are multiple types of glasses frames 30 (such as a glasses frame 30 equipped with a myopic lens, a glasses frame 30 equipped with a hyperopic lens, a glasses frame 30 equipped with a sun lens, or a glasses frame 30 equipped with a plano lens), and there are also multiple types of adapters 13 and the types of adapters 13 are distinguished according to the magnetic field strength of the trigger element mounted thereon, each type of glasses frame 30 is provided with one fixed type of adapter 13. In this way, when different types of adapters 13 are connected to the temple body 11, the magnetic flux generated by them will be different. By using such differences, it is possible to identify which type of glasses frame 30 the temple body 11 is currently connected to. For example, the first preset range can be subdivided into multiple sections, such as a first section, a second section, a third section, a fourth section, etc.

When the magnetic flux is in the first section, it is determined that the temple body 11 is in a first subdivision state; for example, the temple body 11 is connected to a glasses frame 30 equipped with a myopic lens.

When the magnetic flux is in the second section, it is determined that the glasses temple body 11 is in a second subdivision state; for example, the glasses temple body 11 is connected to a glasses frame 30 equipped with a hyperopic lens.

When the magnetic flux is in the third section, it is determined that the temple body 11 is in a third subdivision state; for example, the temple body 11 is connected to a glasses frame 30 equipped with a sun lens.

When the magnetic flux is in the fourth section, it is determined that the temple body 11 is in a fourth subdivision state; for example, the temple body 11 is connected to a glasses frame 30 equipped with a plano lens.

In this way, a more accurate judgment of the connection state of the temple body 11 (for example, an accurate judgment of the connection state of the temple body 11 and different types of glasses frames) can be achieved, which is conducive to the realization of more interactive functions, so that the smart glasses temple 10 and the smart glasses 100 equipped with the smart glasses temple 10 have richer human-computer interaction experience.

Fourth Embodiment

Figure 7:
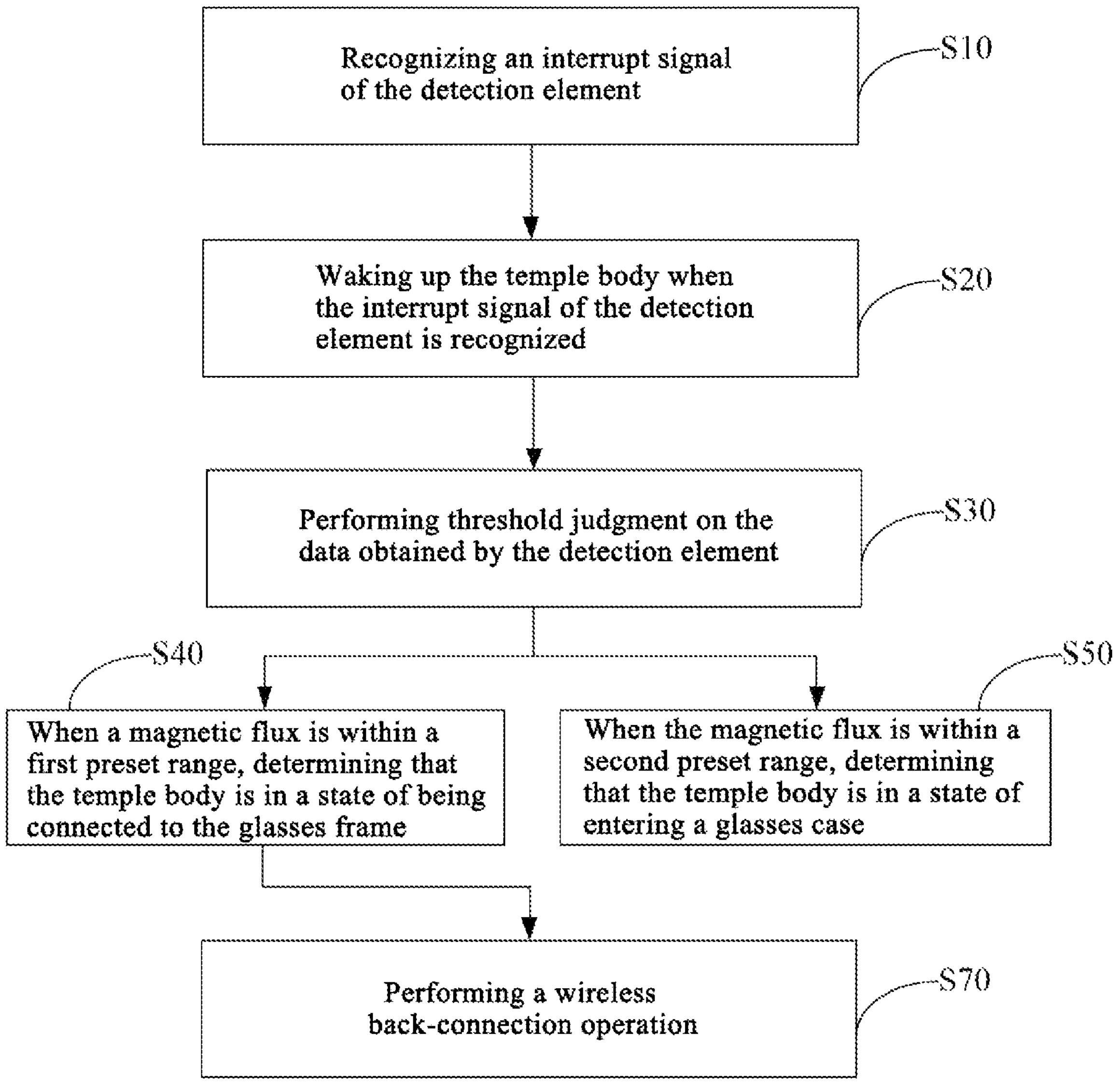
FIG. 7 is a schematic flow chart of a fourth embodiment of a method for controlling a smart glasses temple of the present disclosure.

Referring to FIG. 7, after the step S40, that is, after determining that the temple body 11 is in a state of being connected to the glasses frame 30, the method further comprises:

Step S70, performing a wireless back-connection operation.

It can be understood that when the magnetic flux is in the range A, it can be determined that the temple body 11 is in the sate of being connected to the adapter 13. At this moment, if the adapter 13 has been pre-installed on the glasses frame 30, it can be further determined that the temple body 11 is in the wearable state. At this moment, the operation of wireless back-connection can be performed.

In this way, along with the wake-up of the temple body 11, and along with the determination of the connection relationship between the temple body 11 and the glasses frame 30, the wireless connection between the temple body 11 and the terminal device is also established, so that the smart glasses temple 10 and the smart glasses 100 equipped with the smart glasses temple 10 can be put into use immediately, and the convenience of using the smart glasses temple 10 and the smart glasses 100 equipped with the smart glasses temple 10 is improved.

It should be noted that the wireless connection between the temple body 11 and the terminal device can be realized through Bluetooth, WIFI, 2.4G, Zigbee, or other wireless connection methods. Correspondingly, it can be realized only by providing a Bluetooth module, a WIF module, a 2.4G module, a Zigbee module, etc. in the temple body 11.

Fifth Embodiment

Figure 8:
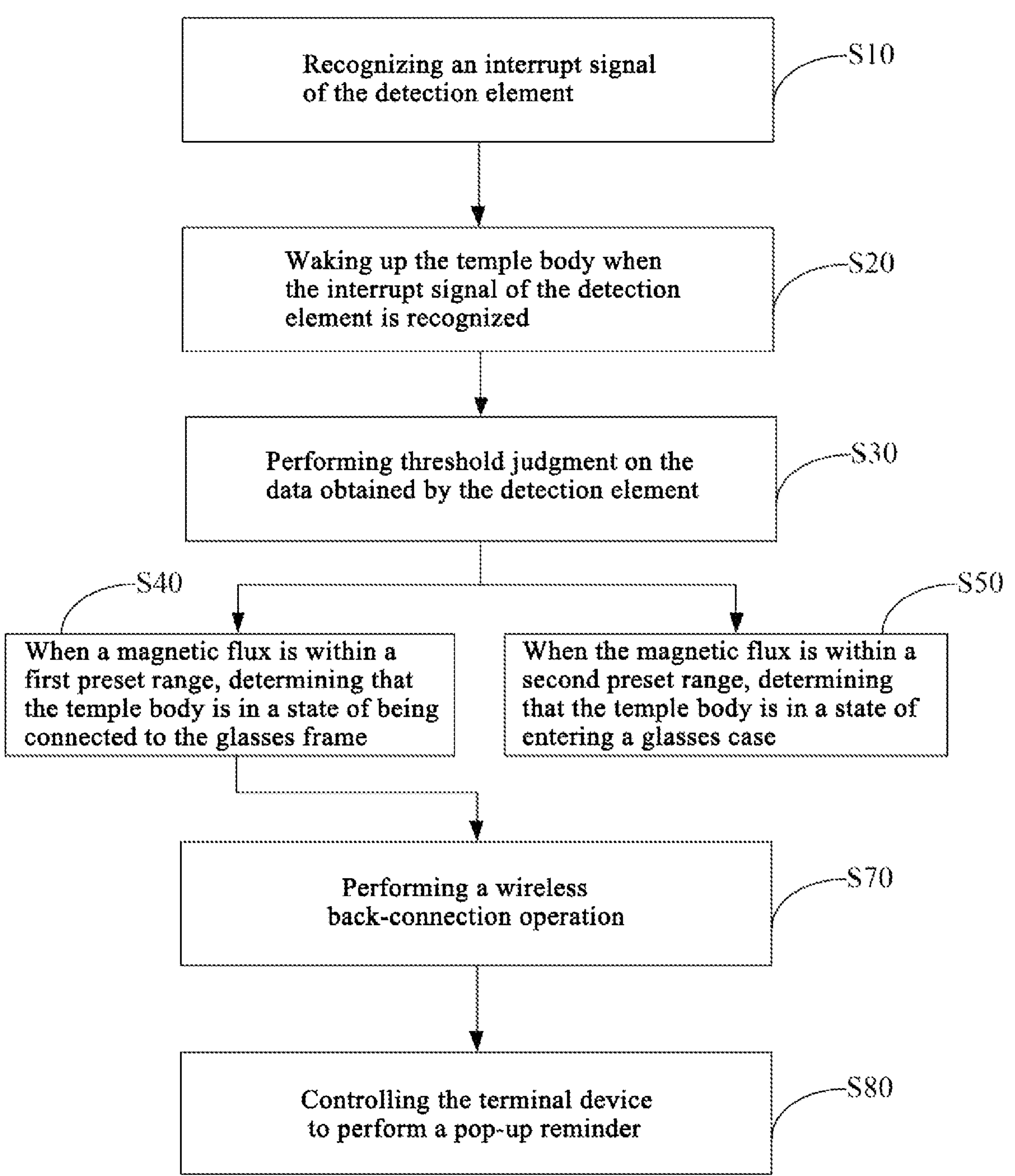
FIG. 8 is a schematic flow chart of a fifth embodiment of a method for controlling a smart glasses temple of the present disclosure.

Referring to FIG. 8, after the step S70, that is, after performing the wireless back-connection operation, the method further comprises:

Step S80, controlling the terminal device to perform a pop-up reminder.

It can be understood that when the wireless connection between the temple body 11 and the terminal device is established, the temple body 11 can issue instructions and control the terminal device to perform a pop-up reminder. Some useful information can be displayed in the pop-up reminder, such as the current electrical quantity of the temple body 11, ongoing items of the previous connection (such as the application program that is being used in the previous connection, etc.) and the like. In this way, it is easier for the user to understand the relevant information of the previous connection, to better decide the current usage method, and to achieve richer interactive experience.

Based on the embodiment of the smart glasses temple 10 in which "the mounting end 111 is provided with an electrical port, and the electrical port is used for electrical conduction with the glasses frame 30 or the charging box", the controller 1001 may call the program for controlling a smart glasses temple stored in the memory 1005, and perform the following operations:

switching the electrical port to a communication mode.

Further, the controller 1001 may call the program for controlling a smart glasses temple stored in the memory 1005, and also perform the following operations:

switching the electrical port to a charging mode.

Sixth Embodiment

Figure 9:
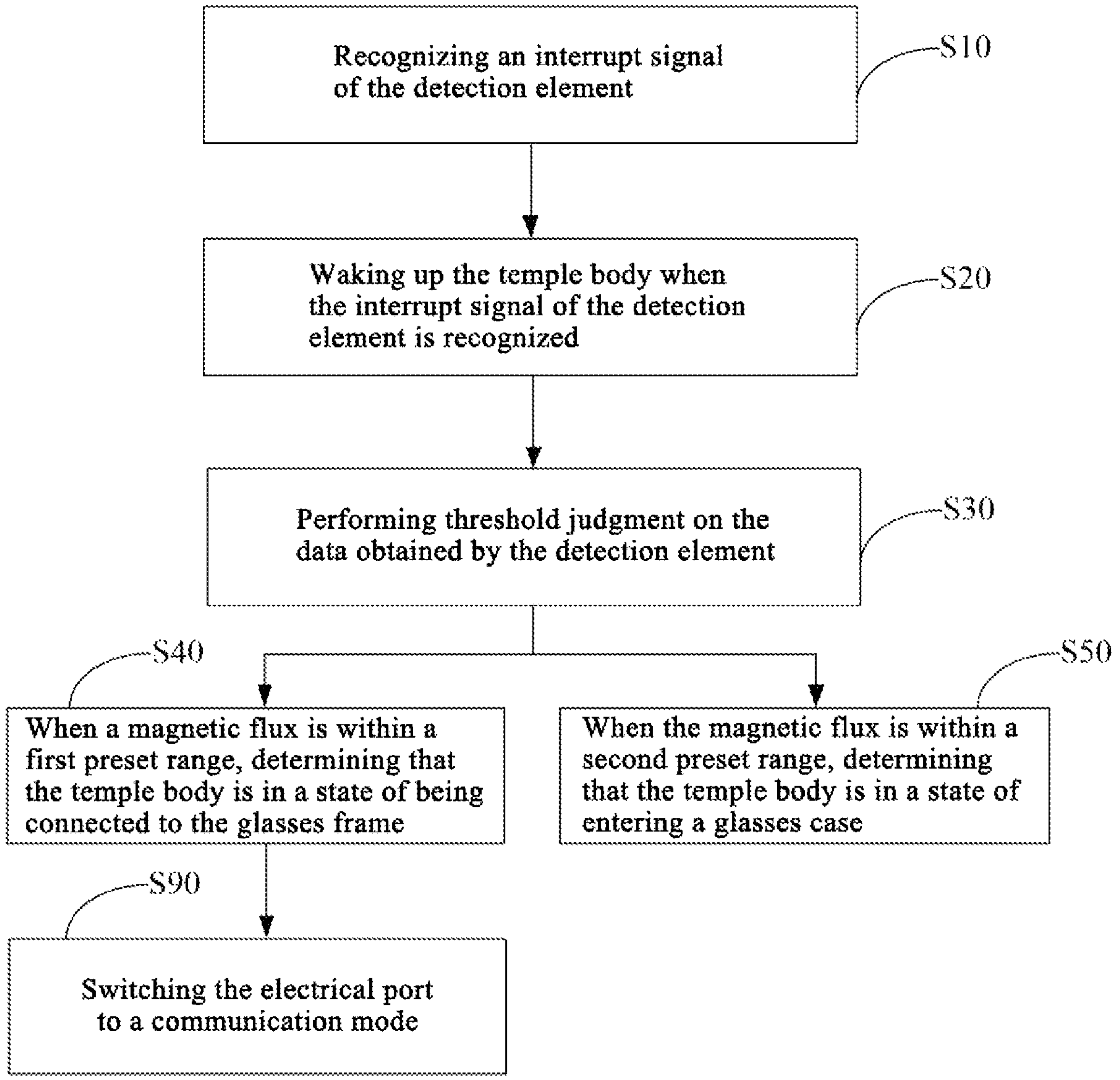
FIG. 9 is a schematic flow chart of a sixth embodiment of a method for controlling a smart glasses temple of the present disclosure.

Referring to FIG. 9, after the step S40, that is, after determining that the temple body 11 is in the state of being connected to the glasses frame 30, the method further comprises:

Step S90, switching the electrical port to a communication mode.

Specifically, the electrical port may be in the form of USB Type-A, USB Type-B, USB Type-C, or Lightning, etc. At this moment, the electrical port has two modes; the communication mode and the charging mode. The electrical port can be used for data interaction in the communication mode, and can be used for charging in the charging mode.

It can be understood that when the magnetic flux is in the range A, it can be determined that the temple body 11 is in the state of being connected to the glasses frame 30. At this moment, if the adapter 13 has been pre-installed on the glasses frame 30, it can be further determined that the temple body 11 is in the wearable state. At this moment, the data interaction between the temple body 11 and the glasses frame 30 can be realized by switching the electrical port to the communication mode.

It should be noted that, in order to achieve matching with the temple body 11, an electrical port may be respectively provided on the assembling end and the adapting end of the adapter 13, and an electrical port is provided on the glasses frame 30. At this moment, the mounting end 111 of the temple body 11 is connected to the assembling end of the adapter 13 so that the two electrical ports between the two are electrically connected, and the adapting end of the adapter 13 is connected to the glasses frame 30 so that the two electrical ports between the two are electrically connected. In this way, the electrical conduction between the temple body and the glasses frame 30 can be realized, thereby realizing operations such as data interaction.

In addition, the two electrical ports in pair may be in the form of male port and female port, so as to improve the stability of electrical conduction.

In addition, the communication mode can also be compatible with the charging mode, that is, the communication mode can perform both the charging operation and the data interaction operation at the same time.

Seventh Embodiment

Figure 10:
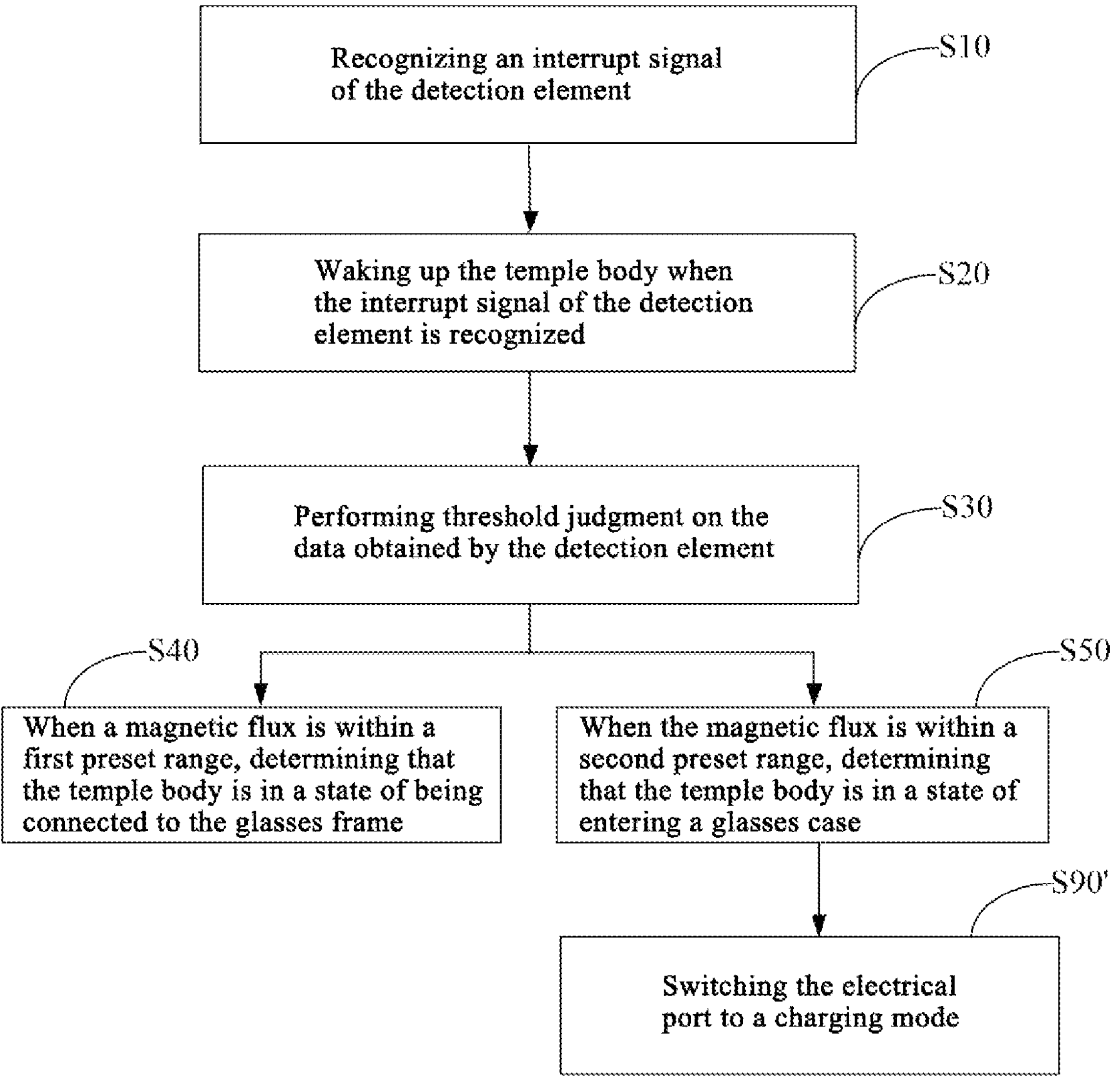
FIG. 10 is a schematic flowchart of a seventh embodiment of a method for controlling a smart glasses temple of the present disclosure.

Please Referring to FIG. 10, after the step S50, that is, after determining that the temple body 11 is in the state of entering the glasses case, the method further comprises:

Step S90', switching the electrical port to the charging mode.

Specifically, the electrical port may be in the form of USB Type-A, USB Type-B, USB Type-C, or Lightning, etc. At this moment, the electrical port has two modes: the communication mode and the charging mode. The electrical port can be used for data interaction in the communication mode, and can be used for charging in the charging mode.

It can be understood that when the magnetic flux is in the range B, it can be determined that the temple body 11 is in the state of entering the glasses case. At this moment, the operation that the glasses case charges the temple body 11 can be realized by switching the electrical port to the charging mode.

It should be noted that, in order to realize matching with the temple body 11, an electrical port may be provided on the glasses case. At this moment, the temple body 11 enters the glasses case and comes to a specific position to make the two electrical ports between the two electrically conductive. In this way, the electrical conduction between the temple body 11 and the glasses case can be realized, thereby realizing the charging operation.

In addition, the two electrical ports in pair may be in the form of male port and female port, so as to improve the stability of electrical conduction.

In addition, the communication mode can also be compatible with the charging mode, that is, the communication mode can perform both the charging operation and the data interaction operation at the same time.

It should be noted that, in the above embodiments, the adapter 13 is a part of the smart glasses temple 10. In actual use, the adapter 13 may be pre-installed on the glasses frame 30, and then various related functions are realized by using the above methods for controlling a smart glasses temple. Of course, in other embodiments, the adapter 13 may also be a part of the glasses frame, or even without the adapter 13, and the trigger element is directly pre-installed on the glasses frame.

In addition, in the above embodiments, the trigger element is arranged at the end of the corresponding main body part, and the detection element is also arranged at the end of the corresponding main body part, so as to realize interaction. Of course, in other embodiments, the trigger element may also be arranged at other positions of the corresponding main body part, and the detection element may also be arranged at other positions of the corresponding main body part. as long as the two can interact.

In addition, in the above embodiments, the electrical port is arranged at the end of the corresponding main body part, so as to realize electrical conduction. Of course, in other embodiments, the electrical port may also be arranged at other positions of the corresponding main body part, as long as it can be electrically connected to other electrical ports.

In order to achieve the above object, the present disclosure also proposes a smart glasses temple including a processor, a memory, and a program for controlling a smart glasses temple that is stored on the memory and can run on the processor. When the program for controlling a smart glasses temple runs on the processor, the method for controlling a smart glasses temple described in any one of the above embodiments is executed.

In order achieve the above object, the present disclosure also proposes an apparatus for controlling a smart glasses temple including a processor, a memory, and a program for controlling a smart glasses temple that is stored on the memory and can run on the processor. When the program for controlling a smart glasses temple runs on the processor, the method for controlling a smart glasses temple described in any one of the above embodiments is executed.

In order to achieve the above object, the present disclosure also proposes a computer-readable storage medium having a program for controlling a smart glasses temple stored thereon. When the program for controlling a smart glasses temple runs on a processor, the method for controlling a smart glasses temple described in any one of the above embodiments is executed.

In some optional embodiments, the processor may be a central processing unit (CPU), or other general-purpose processor, digital signal processor (DSP), application-specific integrated circuit (ASIC), field programmable gate array (FPGA), or other programmable logic device, discrete gate or transistor logic device, discrete hardware component, etc. A general purpose processor may be a microprocessor or any conventional processor or the like.

The memory may be an internal storage unit of the device, such as a hard disk or internal memory of the device. The memory may also be an external storage device of the device, such as a plug-in hard disk, a smart memory card (SMC), a secure digital (SD) card, a flash card, etc. equipped on the device. Further, the memory may include both an internal storage unit of the device and an external storage device. The memory is used to store the computer program and other programs and data required by the device. The memory may also be used to temporarily store data that has been output or is to be output.

A person of ordinary skill in the art can clearly understand that, for the convenience and simplicity of description, only the division of the above functional units or modules is illustrated as an example. In practical applications, the above functions can be allocated to and completed by different functional units and modules, that is, the internal structure of the device is divided into different functional units or modules to complete all or part of the functions described above. In the embodiments, the functional units or modules may be integrated in one processing unit, or each unit may exist physically alone, or two or more units may be integrated into one unit. The above integrated units may be realized in the form of hardware, or may be realized in the form of software functional units. In addition, the specific names of the functional units and modules are only for the convenience of distinguishing from each other, and are not used to limit the protection scope of the present disclosure. For the specific working process of the units and modules in the above system, please refer to the corresponding process in the foregoing method embodiments, which will not be repeated here.

The above only describes the preferred embodiments of the present disclosure, and is not intended to limit the protection scope of the present disclosure. All technical solutions obtained by equivalent structural transformations made on the contents of the description and drawings of the present disclosure or direct/indirect application in other related technical fields under the inventive concept of the present disclosure shall fall within the scope of patent protection of the present application.

The following detailed description is merely exemplary in nature and is not intended to limit the invention or the application and uses of the invention. Furthermore, there is no intention to be bound by any theory presented in the preceding background of the invention or the following detailed description.

What is claimed is:

1. A method for controlling a smart glasses temple, wherein the method is applied to a smart glasses temple comprising a temple body, the temple body is provided with a detection element used to respond to a trigger element on a glasses frame, and the method comprises the steps of:

recognizing an interrupt signal of the detection element; and waking up the temple body when the interrupt signal of the detection element is recognized, wherein, after the step of waking up the temple body, the method further comprises:

performing threshold judgment on the data obtained by the detection element;

when a magnetic flux is within a first preset range, determining that the temple body is in a state of being connected to the glasses frame; and when the magnetic flux is within a second preset range, determining that the temple body is in a state of entering a glasses case.

2. The method for controlling a smart glasses temple according to claim 1, wherein, after the step of determining that the temple body is in a state of being connected to the glasses frame, the method further comprises:

according to comparison of the magnetic flux and multiple preset sections, determining a type of the glasses frame connected to the temple body.

3. The method for controlling a smart glasses temple according to claim 2, wherein the step of determining the type of the glasses frame connected to the glasses temple body comprises:

when the magnetic flux is in a first section, determining that the temple body is connected to a glasses frame equipped with a myopic lens;

when the magnetic flux is in a second section, determining that the temple body is connected to a glasses frame equipped with a hyperopic lens;

when the magnetic flux is in a third section, determining that the temple body is connected to a glasses frame equipped with a sun lens; and when the magnetic flux is in a fourth section, determining that the temple body is connected to a glasses frame equipped with a plano lens.

4. The method for controlling a smart glasses temple according to claim 1, wherein, after the step of determining that the temple body is in a state of being connected to the glasses frame, the method further comprises:

performing a wireless back-connection operation.

5. The method for controlling the temples of smart glasses according to claim 4, wherein, after the step of performing the wireless back-connection operation, the method further comprises:

controlling the terminal device to perform a pop-up reminder.

6. The method for controlling a smart glasses temple according to claim 1, wherein the glasses temple body is provided with an electrical port used for electrical conduction with the glasses frame;

after the step of determining that the temple body is in a state of being connected to the glasses frame, the method further comprises:

switching the electrical port to a communication mode.

7. The method for controlling a smart glasses temple according to claim 1, wherein the temple body is provided with an electrical port used for electrical conduction with the glasses case;

after the step of determining that the temple body is in a state of entering a glasses case, the method further comprises:

switching the electrical port to a charging mode.

8. An apparatus for controlling a smart glasses temple, comprising: a processor, a memory, and a program for controlling a smart glasses temple that is stored in the memory and can run on the processor;

wherein when the program for controlling a smart glasses temple runs on the processor, a method for controlling a smart glasses temple is executed, wherein the method is applied to a smart glasses temple comprising a temple body, the temple body is provided with a detection element used to respond to a trigger element on a glasses frame, and the method comprises the steps of:

recognizing an interrupt signal of the detection element; and waking up the temple body when the interrupt signal of the detection element is recognized, after the step of waking up the temple body, the method further comprises:

performing threshold judgment on the data obtained by the detection element;

when a magnetic flux is within a first preset range, determining that the temple body is in a state of being connected to the glasses frame; and when the magnetic flux is within a second preset range, determining that the temple body is in a state of entering a glasses case.

9. A computer-readable storage medium having a program for controlling a smart glasses temple stored thereon;

wherein when the program for controlling a smart glasses temple runs on a processor, a method for controlling a smart glasses temple is executed, wherein the method is applied to a smart glasses temple comprising a temple body, the temple body is provided with a detection element used to respond to a trigger element on a glasses frame, and the method comprises the steps of:

recognizing an interrupt signal of the detection element; and waking up the temple body when the interrupt signal of the detection element is recognized, after the step of waking up the temple body, the method further comprises:

performing threshold judgment on the data obtained by the detection element;

when a magnetic flux is within a first preset range, determining that the temple body is in a state of being connected to the glasses frame; and when the magnetic flux is within a second preset range, determining that the temple body is in a state of entering a glasses case.

10. The apparatus for controlling a smart glasses temple according to claim 8, wherein, after the step of determining that the temple body is in a state of being connected to the glasses frame, the method further comprises:

according to comparison of the magnetic flux and multiple preset sections, determining a type of the glasses frame connected to the temple body.

11. The apparatus for controlling a smart glasses temple according to claim 10, wherein the step of determining the type of the glasses frame connected to the glasses temple body comprises:

when the magnetic flux is in a first section, determining that the temple body is connected to a glasses frame equipped with a myopic lens;

when the magnetic flux is in a second section, determining that the temple body is connected to a glasses frame equipped with a hyperopic lens;

when the magnetic flux is in a third section, determining that the temple body is connected to a glasses frame equipped with a sun lens; and when the magnetic flux is in a fourth section, determining that the temple body is connected to a glasses frame equipped with a plano lens.

12. The apparatus for controlling a smart glasses temple according to claim 8, wherein, after the step of determining that the temple body is in a state of being connected to the glasses frame, the method further comprises:

performing a wireless back-connection operation.

13. The apparatus for controlling a smart glasses temple according to claim 12, wherein, after the step of performing the wireless back-connection operation, the method further comprises:

controlling the terminal device to perform a pop-up reminder.

14. The apparatus for controlling a smart glasses temple according to claim 8, wherein the glasses temple body is provided with an electrical port used for electrical conduction with the glasses frame;

after the step of determining that the temple body is in a state of being connected to the glasses frame, the method further comprises:

switching the electrical port to a communication mode.

15. The apparatus for controlling a smart glasses temple according to claim 8, wherein the temple body is provided with an electrical port used for electrical conduction with the glasses case;

after the step of determining that the temple body is in a state of entering a glasses case, the method further comprises:

switching the electrical port to a charging mode.

16. The computer-readable storage medium according to claim 9, wherein, after the step of determining that the temple body is in a state of being connected to the glasses frame, the method further comprises:

according to comparison of the magnetic flux and multiple preset sections, determining a type of the glasses frame connected to the temple body.

17. The computer-readable storage medium according to claim 9, wherein, after the step of determining that the temple body is in a state of being connected to the glasses frame, the method further comprises:

performing a wireless back-connection operation.

* * * * *